United States Patent
Qi et al.

(10) Patent No.: US 10,325,152 B1
(45) Date of Patent: Jun. 18, 2019

(54) METHOD OF EXTRACTING WAREHOUSE IN PORT FROM HIERARCHICALLY SCREENED REMOTE SENSING IMAGE

(71) Applicant: Transport Planning and Research Institute Ministry of Transport, Beijing (CN)

(72) Inventors: Yue Qi, Beijing (CN); Xiangjun Nie, Beijing (CN); Min Dong, Beijing (CN); Dachuan Wang, Beijing (CN); Lu Sun, Beijing (CN); Jia Tian, Beijing (CN); Zhuo Fang, Beijing (CN); Rui Li, Beijing (CN); Lei Mei, Beijing (CN); Jing Yang, Beijing (CN)

(73) Assignee: TRANSPORT PLANNING AND RESEARCH INSTITUTE MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 16/205,350

(22) Filed: Nov. 30, 2018

(30) Foreign Application Priority Data

Dec. 4, 2017 (CN) .......................... 2017 1 1256477

(51) Int. Cl.
*G06K 9/00* (2006.01)
*G06K 9/46* (2006.01)
(Continued)

(52) U.S. Cl.
CPC ....... *G06K 9/00637* (2013.01); *G06K 9/4676* (2013.01); *G06K 9/6247* (2013.01);
(Continued)

(58) Field of Classification Search
None
See application file for complete search history.

(56) References Cited

U.S. PATENT DOCUMENTS

| | | | | |
|---|---|---|---|---|
| 2008/0079608 A1* | 4/2008 | Morrell | .................... | G08G 3/00 340/984 |
| 2015/0040064 A1* | 2/2015 | Adi | ..................... | G06F 3/04847 715/810 |
| 2018/0060808 A1* | 3/2018 | Borgerson | ............. | G06Q 40/04 |

FOREIGN PATENT DOCUMENTS

| | | |
|---|---|---|
| CN | 103714341 A | 4/2014 |
| CN | 104537381 A | 4/2015 |

(Continued)

OTHER PUBLICATIONS

Min Dong et al, Research on Port Resource Monitoring Method Based on Object-Oriented Image Analysis Techique, Port Engineering Technology, Oct. 15, 2017, pp. 53-57, vol. 54, No. 5.

*Primary Examiner* — Idowu O Osifade
(74) *Attorney, Agent, or Firm* — Gokalp Bayramoglu (57) ABSTRACT

A method of extracting a warehouse in a port from a hierarchically screened remote sensing image includes the following steps: first, recognizing a texture feature of a remote sensing image and extracting edge lines of a coast of a port; then, selecting a sample of an optional irregular texture region and forming, through a CA transformation, principal component images of different hierarchies by taking a ratio of a between-class difference to an intra-class difference being maximum as an optimization condition; sequentially, extracting a correlation relationship of the warehouse in the port, and forming a feature point set with recognized warehouses to be analyzed; and last, extracting a feature of a visually sensitive image through a scene image to obtain a feedback selection of a real scene image to extract the warehouse in the port accurately.

10 Claims, 3 Drawing Sheets

(51) Int. Cl.
 *G06K 9/62* (2006.01)
 *G06T 7/13* (2017.01)
 *G06T 7/40* (2017.01)
 *G06T 7/149* (2017.01)

(52) U.S. Cl.
 CPC ............... *G06T 7/13* (2017.01); *G06T 7/149* (2017.01); *G06T 7/40* (2013.01); *G06T 2207/10032* (2013.01); *G06T 2207/20016* (2013.01); *G06T 2207/20024* (2013.01); *G06T 2207/20116* (2013.01); *G06T 2207/30184* (2013.01)

(56) References Cited

FOREIGN PATENT DOCUMENTS

| | | | |
|---|---|---|---|
| CN | 106408027 | A | 2/2017 |
| EP | 0549009 | A1 | 6/1993 |
| WO | 2007132902 | A1 | 11/2007 |

\* cited by examiner

METHOD OF EXTRACTING WAREHOUSE IN PORT FROM HIERARCHICALLY SCREENED REMOTE SENSING IMAGE

CROSS REFERENCE TO THE RELATED APPLICATIONS

The present application claims priority to Chinese Patent Application No. 2017112564776 filed on Dec. 4, 2017, the entire content of which is incorporated herein by reference.

TECHNICAL FIELD

The present invention relates to the field of remote sensing technologies, and more particularly to a method of extracting a warehouse in a port from a hierarchically screened remote sensing image.

BACKGROUND

Remote sensing images have been widely used in various aspects, and will be used further as remote sensing image recognition technologies develop further. In applications of remote sensing, information is collected without directly contacting a related target, and the collected information can be interpreted, classified and recognized. With the use of a remote sensing technology, a great quantity of earth observation data can be acquired rapidly, dynamically, and accurately.

As a hub for marine transportation, port plays an extremely important role and is therefore received more and more attentions, becoming an important research direction in marine transportation traffic planning. In the establishment and planning of a port, port data should be collected first, that is, the various ground objects in a port and their positions should be acquired, a logistics warehouse behind a storage yard is an important ground object in a port, and moreover, logistics warehouses are also crucial for a port.

However, it is somewhat difficult to recognize, based on a remote sensing image, a warehouse in the rear of a port, in the prior art, for example, a method of extracting an image of a logistics warehouse behind a storage yard in a port, which is disclosed in Patent Application No. 201610847354.9, includes: (1) applying a lee sigma edge extraction algorithm to a waveband of a remote sensing image, the algorithm using a specific edge filter to create two independent edge images: a bright-edged image and a dim-edged image, from the original image; (2) carrying out a multi-scale segmentation for the bright-edged image and the dim-edged image together with the remote sensing image to obtain an image object; (3) classifying the ones of the obtained image objects having a big blue waveband ratio into a class A, and removing, using a brightness mean feature, the ones in the class A having a relative low brightness mean from the class A; (4) and removing the objects smaller than a specified threshold from the class A using the Normalized Difference Vegetation Index (NDVI) to obtain the category of a warehouse with a blue roof. Based on features of data and those of a logistics warehouse behind a storage yard in a port, an image can be extracted accurately at a high processing efficiency.

Taking an overall view of the foregoing technical solution, actually existing problems and the currently widely used technical solutions, the following major defects are found:

(1) first, no special method is currently available for the remote sensing reorganization of a logistics warehouse in the rear of a port, because existing methods are applicable to recognize other ground objects and incapable of accurately recognizing a warehouse in a port according to features of the warehouse in the port, moreover, because of the lack of pertinence, the processing of remotely sensed big data is low in efficiency;

(2) second, most of existing data processing methods are based on the direct extraction of a remote sensing image, the biggest defect of this extraction mode is heave original data processing workload, and some undesired data or data out of this scope are usually taken into consideration during this calculation process, thus further increasing the complexity of data processing; and (3) last, in an existing data processing process, most of feature processing operations are based on spectral features, although full-color remote sensing images have been developed, spectral feature is still disadvantaged in insufficient spectral information, making it necessary to conduct an advanced computation and an interpolation operation for an approximation recovery during a recognition process, however, this process usually triggers a correction algorithm, thus, to obtain a recognized feature that is close to reality, a large amount of calculation needs to be executed, furthermore, an algorithm correction is circulated during this process, leading to a larger computation load.

SUMMARY

A technical solution adopted by the present invention to solve the technical problems is a method of extracting a warehouse in a port from a hierarchically screened remote sensing image, comprising the following steps:

S100: extracting a coastline of the port based on an active contour model, successively performing texture feature recognition on any region in a remote sensing image to form a sea area texture region and an irregular texture region, and extracting edge lines of the coastline of the port;

S200: extracting principal component images of a plurality of hierarchies using insufficient spectrum features, optionally selecting a sample of the irregular texture region, and forming, through a CA transformation, principal component images of different hierarchies with different difference values by taking the ratio of a between-class difference to an intra-class difference being maximum as an optimization condition;

S300: accurately recognizing the warehouse in the port using a spatial relationship feature, extracting a correlation relationship of the warehouse in the port from the principle component images, and forming a feature point set with recognized warehouses to be analyzed;

S400: extracting a feature of a visually sensitive image from the feature point set through a scene image based on WTA visual rapid adaptation selection to obtain a feedback selection of a real scene image to extract the warehouse in the port.

As a preferred technical solution of the present invention, in step S100, a gray level co-occurrence matrix is used to recognize a texture feature, and the recognition includes the following steps:

S101: optionally selecting a region of the remote sensing image, and setting that the region has L gray level values, in this case, a gray level co-occurrence matrix corresponding to the region is a matrix having L×L orders;

S102: selecting an optional position (i,j) in the matrix, where (i, j=1, 2, ... , L), in this case, an element at the optional position is a pixel at a fixed distance from a pixel having a gray level of i and has a gray level of j, wherein the following fixed positional relationship exists between the two pixels: $\zeta=(DX, DY)$, where $\zeta$ is a displacement, and DX and XY are distances in two directions;

S103: extracting, according to a positional relationship between the gray level co-occurrence matrixes, a texture feature quantity such as an Angular Second Moment (ASM) and a contrast CON, wherein $$ASM = \sum_{i=1}^{L}\sum_{j=1}^{L} P^2(i, j),$$

and $$CON = \sum_{n=1}^{L} n^2 \left[\sum_{i=1}^{L}\sum_{j=1}^{L} P(i, j)\right]|i - j|,$$

where P is a feature vector at the position (i,j), and n is the number of times extraction is performed.

As a preferred technical solution of the present invention, in step S100, extracting edge lines of the coast of the port between the sea area texture region and the irregular texture region using the filter algorithm and optimizing the edge lines of the coast of the port using the filter algorithm specifically includes the following steps: first, acquiring discrete data of a texture feature and selecting a lowest center frequency when extracting an image feature in a filter using a discretized Gabor template matrix and an image data matrix convolution, and then carrying out a frequency spectrum superposition calculation again to obtain a filtered image.

As a preferred technical solution of the present invention, in step S200, before the CA transformation is executed, the maximized ratio of a between-class variance of an optional data set to an intra-class variance of the data set is extracted according to the following linear transformation formula: Y=TX, where T is an ideal transformation matrix, so as to ensure the maximum separability of the data set to provide optimized basic data for the CA transformation.

As a preferred technical solution of the present invention, a specific algorithm of the ideal transformation matrix is as follows:

S201: $\sigma_A$ is set as a standard deviation of a class 1 and a class 2 obtained after the transformation, $\sigma_{w1}$ and $\sigma_{w2}$ are set as intra-class standard deviations of the class 1 and the class 2, and $\sigma_w$ is set as the average value of $\sigma_{w1}$ and $\sigma_{w2}$;

S202: the relationship between a transformed variance and an untransformed variance is as follows:

$\sigma_w^2 = t^T S_w t$, $\sigma_A^2 = t^T S_A t$, where $S_w$ and $S_A$ are an intra-class scatter matrix and a between-class scatter matrix of a given sample, and t is a mapping transformation vector; and S203: the mapping transformation vector t is set as a special value of the ratio $\sigma_A^2/\sigma_w^2$ of the between-class variance and the intra-class variance, that is, $\lambda = \sigma_A^2/\sigma_w^2 = t^T S_A t / t^T S_w t$, when the mapping transformation vector t approximates a maximum value, $(S_A - \Lambda S_W) T = 0$, where $\Lambda$ represents a diagonal matrix consisting of all feature values $\lambda$, and a matrix T composed of all column vectors t is a desired ideal transformation matrix.

As a preferred technical solution of the present invention, in step S300, a correlation relationship of the warehouse in the port is extracted, the correlation relationship includes a point feature, a line feature and a plane feature included in spatial features; a hierarchical relationship feature of the correlation relationship is acquired by extracting a hierarchy attribute of the remote sensing image based on a spectral feature of the remote sensing image.

As a preferred technical solution of the present invention, the correlation relationship of the warehouse in the port includes a road relationship, a transshipment square relationship and an enclosure relationship of the warehouse in the port, and attributes of a whole are extracted using a spatial correlation relationship of the warehouse in the port.

As a preferred technical solution of the present invention, in step S400, the visually sensitive image includes a gray level, colors, edges, textures and a motion, a visual saliency map of each position in a scene image is obtained according to synthesized features, and the mutual competition of a plurality of the visual saliency maps transfers the inhibition of return of focus.

As a preferred technical solution of the present invention, the competition and inhibition of the visual saliency map includes the following steps:

S401: selecting a plurality of parallel and separable feature maps from the feature point set, and recording a hierarchy attribute of each position in a feature dimension on a feature map to obtain the saliency of each position in different feature dimensions;

S402: merging saliencies of different feature maps to obtain a total saliency measure, and guiding a visual attention process; and S403: dynamically selecting, through a WTA network, the position with the highest saliency from the saliency map as the Focus Of Attention (FOA), and then performing the processing circularly through the inhibition of return until a real scene image is obtained.

As a preferred technical solution of the present invention, the method further includes a step S500 of tracking a nonlinear filtering feature, including: separately extracting the filtering feature obtained in step S100 using hierarchical image attributes extracted through the execution of the foregoing four steps, and performing a tracking in a remote sensing analysis image according to a texture feature extracted according to a hierarchical analysis to compensate for an attribute that cannot be directly extracted by tracking a texture feature, so as to form an interpreted remote sensing image, and comparing the formed remote sensing image with a real scene image in step S400 so as to remove an inaccurate tracked texture and keep a rational tracked texture.

Compared with the prior art, the present invention has the following beneficial effects: by extracting the original attribute using a texture feature and dividing edge lines of a coast of a port using a filter, the present invention timely removes data that does not need to be processed and thus reduces the amount of the data sequentially processed; after performing the foregoing processing, the present invention performs a CA transformation to cause the remote sensing image data to be capable of being hierarchized, and then hierarchizes the remote sensing image data using insufficient spectrum information according to a spatial position feature of a warehouse to obtain principal component images of different hierarchies, obtains attributes of a single entity using a spatial relationship among the principal component images and thereby obtains attributes of a whole, thus, the present invention has a high pertinence; moreover, the present invention accurately acquires attributes of a warehouse in a port using a WTA visual rapid adaptation selection algorithm after forming a feature point set, and uses a track optimization algorithm to compensate for distorted data or data that is not acquired through remote sensing to form a complete interpreted image, thus avoiding the use of a correction algorithm and the calculation of an approximate interpolation.

DETAILED DESCRIPTION OF THE EMBODIMENTS

Technical solutions of the present invention will be described clearly and completely below in conjunction with accompanying drawings set forth therein, and apparently, the embodiments described herein are merely a part of, but not all of the embodiments of the present invention. All other embodiments devised by those of ordinary skill without any creative work based on the embodiments described herein should fall within the scope of the present invention.

Embodiment

Figure 1:
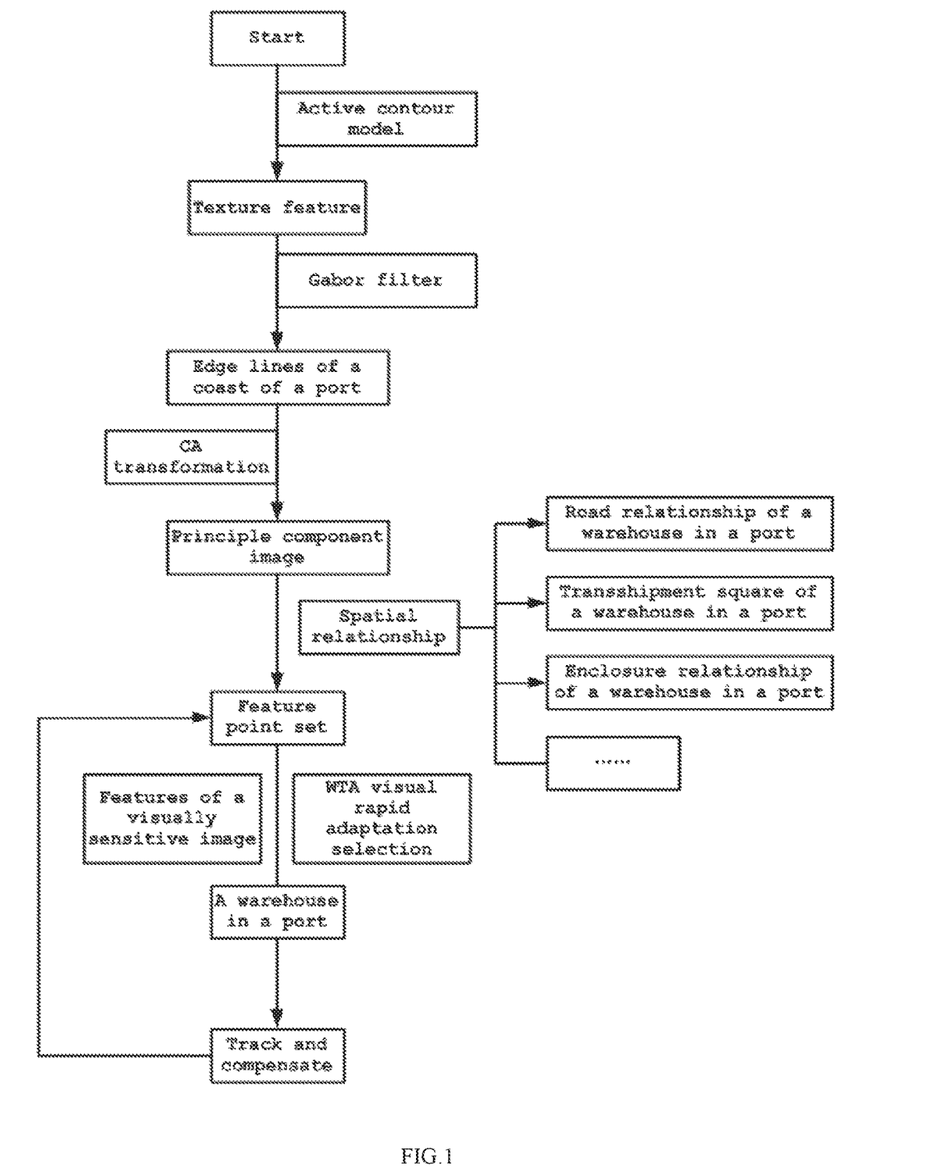
FIG. 1 is a schematic diagram illustrating a flow according to the present invention.
Figure 2:
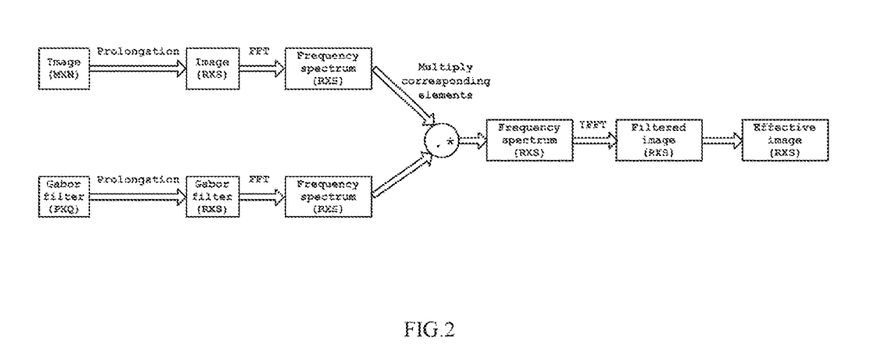
FIG. 2 is a diagram illustrating a flow of extracting a feature by a Gabor filter according to the present invention.
Figure 3:
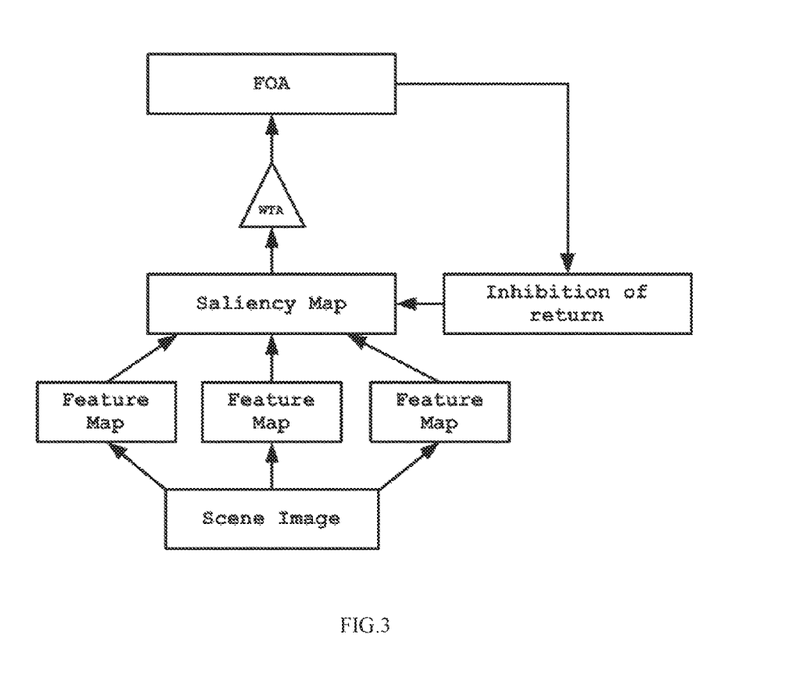
FIG. 3 is a schematic diagram illustrating a structure of a visual model according to the present invention.

As shown in FIG. 1-FIG. 3, the present invention provides a method of extracting a warehouse in a port from a hierarchically screened remote sensing image, comprising the following steps:

S100: extracting a coastline of the port based on an active contour model, successively performing texture feature recognition on any region in a remote sensing image to form a sea area texture region and an irregular texture region, and extracting edge lines of a coastline of the port using a filter algorithm.

In step S100, a gray level co-occurrence matrix is used to recognize a texture feature, the specific recognition includes the following steps:

S101: optionally selecting a region of the remote sensing image, and setting that the region has L gray level values, in this case, a gray level co-occurrence matrix corresponding to the region is a matrix having L×L orders;

S102: selecting an optional position (i,j) in the matrix, wherein (I, j=1, 2, . . . , L), an element at the optional position is a pixel at a fixed distance from a pixel having a gray level of i and has a gray level of j, wherein the following fixed positional relationship exists between the two pixels: $\zeta=(DX, DY)$, where $\zeta$ is a displacement, and DX and XY are distances in two directions; and S103: extracting, according to a positional relationship between the gray level co-occurrence matrixes, a texture feature quantity such as an Angular Second Moment (ASM) and a contrast CON, wherein $$ASM = \sum_{i=1}^{L}\sum_{j=1}^{L} P^2(i, j),$$

and $$CON = \sum_{n=1}^{L} n^2 \left[ \sum_{i=1}^{L}\sum_{j=1}^{L} P(i, j) \right] |i - j|,$$

where P is a feature vector at the position (i,j), and n is the number of times extraction is performed.

The gray level co-occurrence matrix mentioned in the foregoing steps is a common means for processing a texture feature of a remote sensing image, and a gray level co-occurrence matrix is used herein for processing a texture feature mainly for the following reasons:

1: texture features of local image regions should be counted before the gray level co-occurrence matrix performs a texture feature analysis, and the extraction method provided herein needs to perform an extraction operation for a plurality of times using local features, thus, the extraction method provided herein is capable of performing an extraction operation in the original remote sensing image and directly using the extracted information in subsequent steps;

2: in the use of the gray level co-occurrence matrix, generally, more than one texture feature is extracted in the gray level co-occurrence matrix, thus, a plurality of texture features can be used herein as a basis for a multi-hierarchical screening, moreover, it is common that some hierarchies lose image information during a multi-hierarchical screening, however, the extraction of a plurality of texture features can compensate for the lost information to a certain extent, thus further improving the quality of image extraction;

3: the most important point is that most of the texture features extracted using a gray level co-occurrence matrix are related with each other, that is, the texture features extracted using a gray level co-occurrence matrix can visually reflect a spatial relationship whose application is emphasized herein and which is even a basis for the accurate recognition of a warehouse in a port; in addition to facilitating the direct implementation of a subsequent operation, decreasing unnecessary calculation, and increasing the speed of calculation, the pre-analysis of a corresponding texture feature is also advantaged in being independent from a spatial relationship in an actual operation although capable of visually embodying a spatial relationship of textures, therefore, as an earlier data processing, the pre-analysis, although average in texture feature recognition, reduces the amount of the data processed, increases the speed of operation, and can lay a foundation for a subsequent accurate recognition.

For the filter algorithm used in step S100, it should also be noted that in this step, due to the selection of a common Gabor filter as a filter algorithm, optimizing edge lines of a coast in a port using a filter algorithm refers specifically to: first, obtaining the discrete data obtained in the foregoing step, selecting, using a discretized Gabor template matrix and an image data matrix convolution, the lowest center frequency when extracting an image feature using a filter, and performing a frequency spectrum superposition calculation again to calculate a filtered image.

In the actual application of the Gabor filter algorithm, it should be emphasized herein that it is well known that a big convolution matrix will increase a computation burden sharply, this problem exists in the present invention as well, for this sake, a convolution matrix needs to be optimized further to conquer the problem of heave computation burden, and as shown in FIG. 2, the optimization is specifically realized by: first, setting Fourier transformations of two convolution matrixes $f_1$ and $f_2$ as $F_1$ and $F_2$, in this case, the following equations are obtained: $F_1=fft(f_1)$, and $F_2=fft(f_2)$;

according to the convolution theorem, the following equation is obtained: $conv(f_1,f_2)=ifft(F_1.*F_2)$, where cony represents a convolution, fft represents a Fourier transformation, ifft represents an inverse transformation of a Fourier transformation, and $F_1.*F_2$ represents the multiplying of corresponding elements in two matrixes $F_1$ and $F_2$.

By performing an optimization operation through the execution of the foregoing steps, the amount of calculation conducted to extract multi-hierarchical data is remarkably reduced, thus significantly increasing the efficiency of calculation, improving the actual handling capacity, and preventing calculation from being circularly repeated redundantly.

S200: extracting principal component images of a plurality of hierarchies using insufficient spectrum features, optionally selecting a sample of the irregular texture region, and forming, through a CA transformation, principal component images of different hierarchies with different difference values by taking the ratio of a between-class difference to an intra-class difference being maximum as an optimization condition;

The CA transformation specifically refers to a method for the discriminant analysis of feature extraction, which is applied to extracting a feature and capable of maximizing the ratio of a between-class variance of any data set to an intra-class variance of the data set to ensure the maximum separability of the data set.

As a canonical analysis transformation (that is, a method for the discriminant analysis of feature extraction) is an orthogonal linear transformation based on a classified statistic feature obtained through a sample analysis, in step S200, before the CA transformation is executed, the maximized ratio of a between-class variance of an optional data set to an intra-class variance of the data set is extracted according to the following linear transformation formula: $Y=TX$, where T is an ideal transformation matrix, so as to ensure the maximum separability of the data set to provide optimized basic data for the CA transformation.

A specific algorithm of the ideal transformation matrix is as follows:

S201: $\sigma_A$ is set as a standard deviation of a class 1 and a class 2 obtained after the transformation, $\sigma_{w1}$ and $\sigma_{w2}$ are set as intra-class standard deviations of the class 1 and the class 2, and $\sigma_w$ is set as the average value of $\sigma_{w1}$ and $\sigma_{w2}$;

S202: the relationship between a transformed variance and an untransformed variance is as follows:

$\sigma_w^2=t^T S_w t$, $\sigma_A^2=t^T S_A t$, where $S_w$ and $S_A$ are an intra-class scatter matrix and a between-class scatter matrix of a given sample, and t is a mapping transformation vector; and S203: the mapping transformation vector t is set as a special value of the ratio $\sigma_A^2/\sigma_W^2$ of the between-class variance and the intra-class variance, that is, $\lambda=\sigma_A^2/\sigma_W^2=t^T S_A t/t^T S_w t$, when the mapping transformation vector t approximates a maximum value, $(S_A-\Lambda S_W) T=0$, where $\Lambda$ represents a diagonal matrix consisting of all feature values $\lambda$, and a matrix T composed of all column vectors t is a desired ideal transformation matrix.

To sum up, by taking the ratio of a between-class difference to an intra-class difference being maximum as an optimization condition, the CA transformation allows a first model corresponding to a maximum feature value to contain maximum separable information, and so on and so forth, a plurality of separable information axes can be obtained through the CA transformation in a plurality of dimensions, in this way, principle component images of a plurality of hierarchies can be extracted using insufficient spectrum features, moreover, it also should be noted that the CA transformation also decreases the number of the dimensions of a data space while increasing the separability of a class and thus reduces the complexity of an actual operation.

In the foregoing steps, the use of the CA transformation causes data concentrated in a remote sensing image to be separable, that is, the data subjected to the CA transformation have an excellent separability so that data can be hierarchically extracted without loss in subsequent transformations, resulting in that principle component images of the original remote sensing image can be hierarchically extracted.

Step S300: accurately recognizing the warehouse in the port using a spatial relationship feature, extracting a correlation relationship of the warehouse in the port from the principle component images, the correlation relationship of the warehouse in the port includes a road relationship, a transshipment square relationship and an enclosure relationship of the warehouse in the port, extracting attributes of a whole using the spatial correlation relationship of the warehouse in the port, and forming a feature point set with recognized warehouses to be analyzed.

Spatial feature, which is seldom used in remote sensing image processing, is mainly realized as a relationship pattern in a remote sensing image, that is, in a specific remote sensing image analysis, the final recognition of a target is realized using correlated features, in a remote sensing image, it is not easy to recognize attributes of an entity in a certain relationship by separately observing the entity, however, when a correlation of spatial relationship is introduced, attributes of an entity can be known using the correlated spatial relationship, and even attributes of a whole consisting of entities can be recognized using a structural feature and a relationship feature.

In step S300, a correlation relationship of the warehouse in the port is extracted, the correlation relationship includes a point feature, a line feature and a plane feature included in spatial features; a hierarchical relationship feature of the correlation relationship is acquired by extracting a hierarchy attribute of the remote sensing image based on a spectral feature of the remote sensing image.

S400: extracting a feature of a visually sensitive image from a scene image based on WTA visual rapid adaptation selection to obtain a feedback selection of a real scene image to extract the warehouse in the port.

Figure 4:
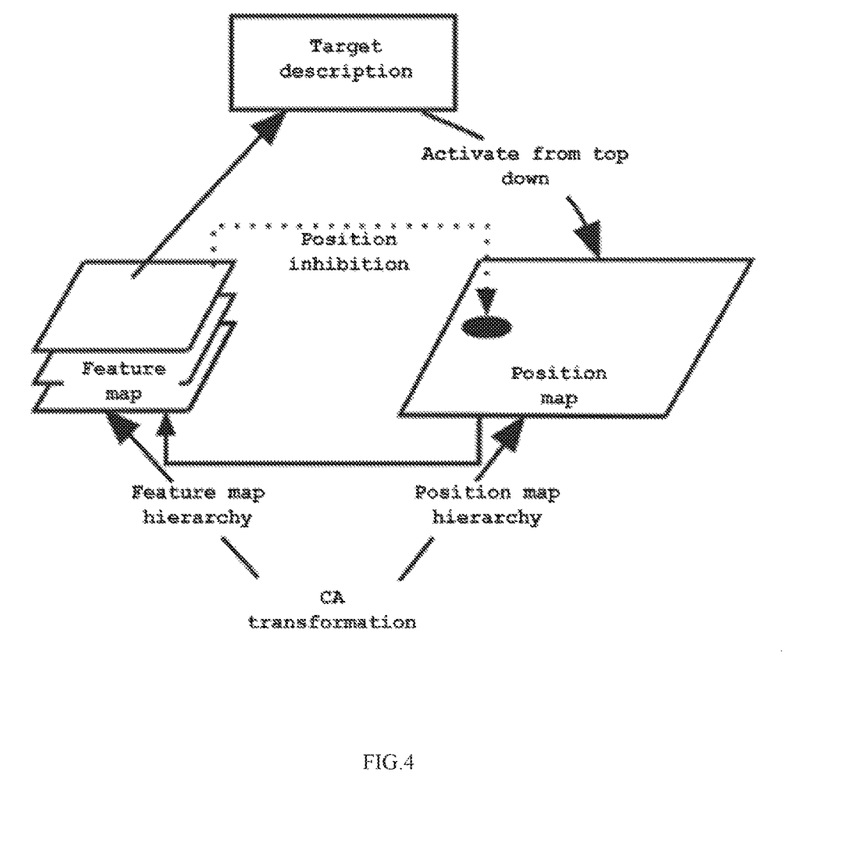
FIG. 4 is a schematic diagram illustrating a competition and inhibition structure of a visual saliency map according to the present invention.

As shown in FIG. 4, in step S400, the visually sensitive image includes a gray level, colors, edges, textures and a motion, a visual saliency map of each position in a scene image is obtained according to synthesized features, and the mutual competition of a plurality of the visual saliency maps transfers the inhibition of return of focus.

the competition and inhibition of the visual saliency map includes the following steps:

S401: selecting a plurality of parallel and separable feature maps from the feature point set, and recording a hierarchy attribute of each position in a feature dimension on a feature map to obtain the saliency of each position in different feature dimensions;

S402: merging saliencies of different feature maps to obtain a total saliency measure, and guiding a visual attention process; and S403: dynamically selecting, through a WTA network, the position with the highest saliency from the saliency map as the Focus Of Attention (FOA), and then performing the processing circularly through the inhibition of return until a real scene image is obtained.

Moreover, in the present invention, it also should be noted that the method further includes a step S500 of tracking a nonlinear filtering feature, including: separately extracting the filtering feature obtained in step S100 using hierarchical image attributes extracted through the foregoing four steps, and performing a tracking in a remote sensing analysis image according to a texture feature extracted according to a hierarchical analysis to compensate for an attribute that cannot be directly extracted by tracking a texture feature, so as to form an interpreted remote sensing image, and comparing the formed remote sensing image with a real scene image in step S400 after forming the interpreted remote sensing image so as to remove an inaccurate tracked texture and keep a rational tracked texture.

In conclusion, the main features of the present invention lie in that: by extracting the original attribute using a texture feature and dividing edge lines of a coast of a port using a filter, the present invention timely removes data that does not need to be processed and thus reduces the amount of the data sequentially processed; after performing the foregoing processing, the present invention performs a CA transformation to cause the remote sensing image data to be capable of being hierarchized, and then hierarchizes the remote sensing image data using insufficient spectrum information according to a spatial position feature of a warehouse to obtain principal component images of different hierarchies, obtains attributes of a single entity using a spatial relationship among the principal component images and thereby obtains attributes of a whole, thus, the present invention has a high pertinence; moreover, the present invention accurately acquires attributes of a warehouse in a port using a WTA visual rapid adaptation selection algorithm after forming a feature point set, and uses a track optimization algorithm to compensate for distorted data or data that is not acquired through remote sensing to form a complete interpreted image, thus avoiding the use of a correction algorithm and the calculation of an approximate interpolation.

It is apparent for those skilled in the art that the present invention is not limited to details of the foregoing exemplary embodiments and the present invention can be realized in other specific forms without departing from the spirit or basic features of the present invention. Thus, the embodiments should be regarded as exemplary but not limitative in any aspect; because the scope of the present invention is defined by appended claims but not the foregoing description, the present invention is intended to cover all the variations falling within the meaning and scope of an equivalent of the claims. Any reference symbol in the claims should not be construed as limiting a relevant claim.

What is claimed is:

1. A method of extracting a warehouse in a port from a hierarchically screened remote sensing image, comprising the following steps:
    S100: extracting a coastline of the port based on an active contour model, successively performing a texture feature recognition on any region in a remote sensing image to form a sea area texture region and an irregular texture region, and extracting edge lines of the coastline of the port;
    S200: extracting principal component images of a plurality of hierarchies using insufficient spectrum features, selecting a sample of the irregular texture region, and forming, through a CA transformation, principal component images of different hierarchies with different difference values by taking a ratio of a between-class difference to an intra-class difference being maximum as an optimization condition;
    S300: accurately recognizing the warehouse in the port using a spatial relationship feature, extracting a correlation relationship of the warehouse in the port from the principle component images, and forming a feature point set with recognized warehouses to be analyzed; and
    S400: extracting a feature of a visually sensitive image from the feature point set through a scene image based on WTA visual rapid adaptation selection to obtain a feedback selection of a real scene image to extract the warehouse in the port.

2. The method of extracting the warehouse in the port from the hierarchically screened remote sensing image according to claim 1, wherein
    in step S100, a gray level co-occurrence matrix method is used for the texture feature recognition, and the texture feature recognition comprises the following steps:
    S101: selecting a region of the remote sensing image, and setting that the region has L gray level values, and a gray level co-occurrence matrix corresponding to the region is a matrix having L×L orders;
    S102: selecting a position (i, j) in the matrix, where (i, j=1, 2, ..., L), wherein, an element at the optional position is a first pixel at a fixed distance from a second pixel having a gray level of i and a gray level of j, wherein the following fixed positional relationship exists between the first pixel and the second pixel: $\zeta=(DX, DY)$, where $\zeta$ is a displacement, and DX and DY are distances in two directions;
    S103: extracting, according to a positional relationship between gray level co-occurrence matrixes, a texture feature quantity including an Angular Second Moment (ASM) and a contrast CON, wherein $$ASM = \sum_{i=1}^{L}\sum_{j=1}^{L} P^2(i, j),$$

and $$CON = \sum_{n=1}^{L} n^2 \left[\sum_{i=1}^{L}\sum_{j=1}^{L} P(i, j)\right]|i - j|,$$

where P is a feature vector at the position (i,j), and n is the number of times the extraction is performed.

3. The method of extracting the warehouse in the port from the hierarchically screened remote sensing image according to claim 1, wherein
    in step S100, extracting edge lines of the coast of the port between the sea area texture region and the irregular texture region using the filter algorithm and optimizing the edge lines of the coast of the port using the filter algorithm comprises the following steps: first, acquiring discrete data of a texture feature and selecting a lowest center frequency when extracting an image feature in a filter using a discretized Gabor template matrix and an image data matrix convolution, and then carrying out a frequency spectrum superposition calculation again to obtain a filtered image.

4. The method of extracting the warehouse in the port from the hierarchically screened remote sensing image according to claim 1, wherein in step S200, before the CA transformation is executed, a maximized ratio of a between-class variance of an optional data set to an intra-class variance of the optional data set is extracted according to the following linear transformation formula: Y=TX, where T is an ideal transformation matrix, so as to ensure the maximum separability of the optional data set to provide optimized basic data for the CA transformation.

5. The method of extracting the warehouse in the port from the hierarchically screened remote sensing image according to claim 4, wherein
a specific algorithm of the ideal transformation matrix is as follows:

S201: $\sigma_A$ is set as a standard deviation of a class 1 and a class 2 obtained after the CA transformation, $\sigma_{w1}$ and $\sigma_{w2}$ are set as intra-class standard deviations of the class 1 and the class 2, and $\sigma_w$ is set as an average value of $\sigma_{w1}$ and $\sigma_{w2}$;

S202: a relationship between a transformed variance and an untransformed variance is as follows:
$\sigma_w^2 = t^T S_w t$, $\sigma_A^2 = t^T S_A t$, where $S_w$ and $S_A$ are an intra-class scatter matrix and a between-class scatter matrix of a given sample, and t is a mapping transformation vector; and S203: the mapping transformation vector t is set as a special value of a ratio $\sigma_A^2/\sigma_W^2$ of the between-class variance and the intra-class variance, where, $\lambda = \sigma_A^2/\sigma_W^2 = t^T S_A t / t^T S_w t$, when the mapping transformation vector t approximates a maximum value, $(S_A - \Lambda S_W)T = 0$, where $\Lambda$ represents a diagonal matrix consisting of all feature values $\lambda$, and a matrix T composed of all column vectors t is a desired ideal transformation matrix.

6. The method of extracting the warehouse in the port from the hierarchically screened remote sensing image according to claim 1, wherein
in step S300, a correlation relationship of the warehouse in the port is extracted, the correlation relationship includes a point feature, a line feature and a plane feature included in spatial features; a hierarchical relationship feature of the correlation relationship is acquired by extracting a hierarchy attribute of the remote sensing image based on a spectral feature of the remote sensing image.

7. The method of extracting the warehouse in the port from the hierarchically screened remote sensing image according to claim 6, wherein
the correlation relationship of the warehouse in the port includes a road relationship, a transshipment square relationship and an enclosure relationship of the warehouse in the port, and attributes of a whole are extracted using a spatial correlation relationship of the warehouse in the port.

8. The method of extracting the warehouse in the port from the hierarchically screened remote sensing image according to claim 1, wherein
in step S400, the visually sensitive image includes a gray level, colors, edges, textures and a motion, a visual saliency map of each position in a scene image is obtained according to synthesized features, and a mutual competition of a plurality of the visual saliency maps transfers an inhibition of return of focus.

9. The method of extracting the warehouse in the port from the hierarchically screened remote sensing image according to claim 8, wherein
the mutual competition and the inhibition of the visual saliency map comprise the following steps:

S401: selecting a plurality of parallel and separable feature maps from the feature point set, and recording a hierarchy attribute of each position in a feature dimension on a feature map to obtain a saliency of each position in different feature dimensions;

S402: merging saliencies of different feature maps to obtain a total saliency measure, and guiding a visual attention process; and S403: dynamically selecting, through a WTA network, a position with the highest saliency from the saliency map as a Focus Of Attention (FOA), and then performing the processing circularly through the inhibition of return until a real scene image is obtained.

10. The method of extracting the warehouse in the port from the hierarchically screened remote sensing image according to claim 1, further comprising:
a step S500 of tracking a nonlinear filtering feature, comprising: separately extracting a filtering feature obtained in step S100 using hierarchical image attributes extracted through S100, S200, S300 and S400, and performing a tracking in a remote sensing analysis image according to a texture feature extracted according to a hierarchical analysis to compensate for an attribute that cannot be directly extracted by tracking the texture feature to form an interpreted remote sensing image, and comparing the interpreted remote sensing image after being formed with a real scene image in step S400 to remove an inaccurate tracked texture and keep a rational tracked texture.

* * * * *